United States Patent [19]

Finley

[11] 3,941,771

[45] Mar. 2, 1976

[54] DEXTRIN CARBOXYLATES AND THEIR USE AS DETERGENT BUILDERS

[75] Inventor: Joseph H. Finley, Metuchen, N.J.

[73] Assignee: FMC Corporation, Princeton, N.J.

[22] Filed: Aug. 22, 1973

[21] Appl. No.: 390,524

[52] U.S. Cl. ............. 260/233.5; 252/156; 252/171
[51] Int. Cl.$^2$........................................ C08B 31/02
[58] Field of Search ................................ 260/233.5

[56] References Cited
UNITED STATES PATENTS

| | | | |
|---|---|---|---|
| 3,720,663 | 3/1973 | Tessler | 260/233.5 |
| 3,728,332 | 4/1973 | Tessler et al. | 260/233.5 |
| 3,732,207 | 5/1973 | Kovats | 260/233.5 |
| 3,756,966 | 9/1973 | Lamberti | 260/233.5 |
| 3,849,341 | 11/1974 | Lamberti | 252/546 |

*Primary Examiner*—Melvyn I. Marquts

[57] ABSTRACT

A dextrin carboxylate comprising a dextrinized starch of about 20 to about 100 anhydroglucose units wherein from about 2.2 to about 2.8, preferably about 2.6 average OH groups per anhydroglucose unit are esterified through one of the carboxyls of a non-aromatic polycarboxylic acid of 2–4 carboxyls containing 2 to 10 carbon atoms. The products are effective biodegradable detergent builders.

4 Claims, No Drawings

DEXTRIN CARBOXYLATES AND THEIR USE AS DETERGENT BUILDERS

This invention relates to detergent builders, particularly to those derived from dextrinized starch.

In the cleansing at it is known that the detergency level of soaps and synthetic surfactants can be increased by the presence of certain materials commonly referred to as builders. Such cleansing fortifiers make possible the attainment of superior cleaning performance and at lower cost than can be realized with the so-called non-built detergent compositions.

The mechanism by which builders enhance the cleansing action of detergents is not fully understood. Although several explanations have been advanced, none of these has proved entirely satisfactory. This is not too surprising considering the complex nature of detergency and the numerous factors which contribute to overall cleansing performance. It is generally agreed that builder compounds must exhibit at least some effect in such areas as stabilization of solid soil suspension, emulsification of soil particles, the surface activity of aqueous detergent solutions, solubilization of water-insoluble materials, foaming or suds-producing characteristics of the washing solution, peptization of soil agglomerates, neutralization of acid soil, and the inactivation of mineral constituents present in the washing solution. Builder materials should exhibit certain ancillary properties in order to be acceptable in current washing processes and consumer marketing techniques. Thus, a builder should preferably be white, inexpensive, non-toxic, non-corrosive, non-hygroscopic and stable to oxidizers, hot alkaline detergent solutions and spray drying operations.

Of all of the known builders the condensed inorganic phosphates find the widest commercial acceptance. Sodium tripolyphosphate is especially favored being used in both home and industrial cleansing. However, detergent phosphate is a nutrient which when discharged into natural waters, is alleged to contribute to the growth of aquatic plants. Although the ecological impact of phosphate is still being debated in scientific circles, considerable work is being done in an effort to find suitable substitutes. In general, the object is to produce biologically active substances which are metabolized by microorganisms.

A large variety of organic materials containing only carbon, hydrogen and oxygen have been examined and tested as biologically degradable builders. These include both synthetic and natural products as well as chemically modified natural products. In their chemical configuration, the materials aforesaid commonly contain a plurality of carboxylic acid functions, often as pendant groups attached to a polymer chain.

One class of carboxylated polymers which has shown promise as biodegradable detergent builders are carboxylated starches of the type described in German Pat. No. 2,148,279. These are prepared by reacting some of the hydroxyl functions in the anhydroglucose units of the starch with a cyclic anhydride of a polycarboxylic acid to produce a modified starch having the structure

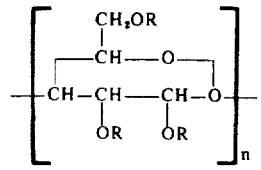

Wherein R is hydrogen or a carboxylate ester moiety of the formula

wherein M is an alkali metal; X is the hydrocarbon portion of the carboxylate ester and n is about 100 to 5000. For effective detergent building properties, the degree of substitution (D.S. value) i.e., average number of R groups per anhydroglucose monomer unit is preferably 1.5–3.

The aforementioned compounds are for the most part known compounds and their method of preparation is described in the art (Mullen and Pacsu, Ind. Eng. Chem. 35 381 (1943); ibid. 34 1209 (1942); Malm and Fordyce, ibid. 32 405 (1940)). In general, they may be prepared by heating starch with a cyclic anhydride in a suitable solvent medium such as toluene or pyridine and precipitating the resulting acid ester from water by the use of an acid such as hydrochloric acid. Accordingly, by heating the starch with succinic, glutaric, maleic, phthalic, citraconic, itaconic or diglycolic anhydrides, there is formed the corresponding succinate, glutarate, maleate, phthalate, citraconate, itaconate or diglycolate acid ester of the polysaccharide. Although the carboxylated starches of the German patent generally perform well as builders at D.S. levels above 1.5, it is exceedingly difficult to reach D.S. levels exceeding 2 using the procedure referred to in the specification. From a practical standpoint therefore, the detergent builders of the German patent are not satisfactory.

In accordance with the present invention, a new class of starch derived detergent builders has been discovered comprising a dextrinized starch of about 20 to about 100 anhydroglucose units wherein from about 2.2 to about 2.8, preferably about 2.6 average OH groups per anhydroglucose unit are esterified through one of the carboxyls of a non-aromatic polycarboxylic acid of 2 to 4 carboxyls containing 4 to 10 carbon atoms.

The herein carboxylated dextrinized starches, or more simply carboxylated dextrins, are novel polymeric compounds formed by reacting a dextrin with a cyclic anhydride of the polycarboxylic acid aforesaid. The resulting acid ester is then neutralized with an appropriate base to give the soluble dextrin carboxylate salt for use in detergent formulations. In general, the reaction can be carried out using the methods of preparing the starch carboxylates of the German patent and described in the aforecited publications. Following these procedures, the dextrin carboxylates of the invention may be prepared by heating the requisite dextrin with a polycarboxylic acid anhydride in a suitable solvent medium such as toluene or pyridine and precipitating the so-obtained acid ester from water by acidification with mineral acid such as hydrochloric. The acid form of the dextrin carboxylate is neutralized with base, commonly alkali metal hydroxide to produce the soluble alkali salt, usually the sodium salt.

Exemplary non-aromatic polycarboxylic acids include succinic, adipic, methylsuccinic, glutaric, 1,2-cyclohexane dicarboxylic acid, maleic, citraconic, itaconic, 1,2-cyclobutane dicarboxylic acid, diglycolic or others having from 4 to 10 carbon atoms.

In view of the complex chemical configuration of the herein dextrin carboxylates, the degree of substitution (D.S. value) refers to the average number of ester carboxylates functions attached per anhydroglucose unit. Thus a D.S. of 2.6 signifies that 260 carboxylate ester groups are present, on the average, per 100 anhydroglucose units. The distribution of the carboxylate ester groups is entirely random, some of the anhydroglucose containing less than 2.6 ester group and others containing more; up to the theoretical maximum of 3. The degree of substitution can be determined by neutralizing the acid ester function with standard alkali solutions by the known procedures.

Dextrins are well known materials which have been commercially available for many years. They are made by heating starch, either alone or in the presence of chemical reagents such as acids or enzymes. (Kirk-Othmer, Encyclopedia of Chemical Technology Second Edition, Vol. 18, p. 682.) These reactions fall into the following three catagories:

1. Fragmentation — The starch polymer is cleaved at various points to give lower molecular weight fragments.

2. Transglucosidation — 1,4 carbon oxygen bonds are cleaved and new anhydroglucose linkages are formed at the 2, 3 or 6 positions. This is illustrated below for a 1, 4 → 1,6 cleavage.

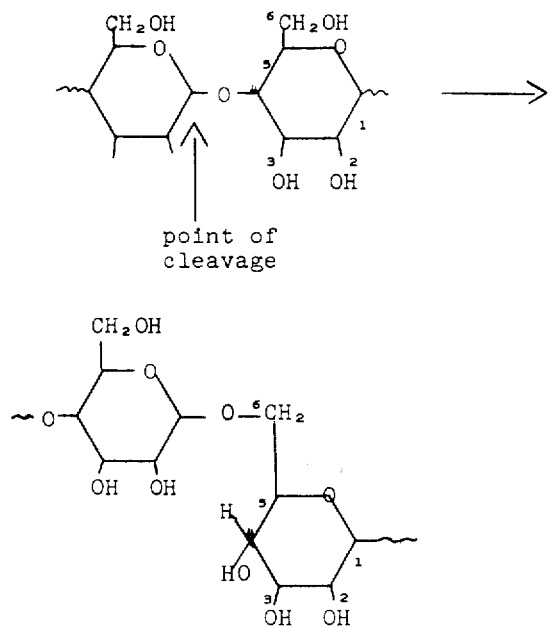

The resulting product has a more highly branched tree-like structure, that can markedly affect physical and chemical properties.

3. Repolymerization — Small fragments recombine to give higher molecular weight products. The individual steps above occur essentially sequentially rather than simultaneously during dextrinization. Steps 2 and 3 are largely thermodynamically controlled. Therefore, the extent of branching and repolymerization can be altered by varying reaction temperature. The initial fragmentation reaction (step 1) is primarily controlled by the concentration of acid catalyst used.

There are three types of dextrins identified as white dextrins, yellow or canary dextrins and British gums. They are classified according to the general methods used in their preparation which produce respectively: very slight, intermediate or a high degree of branching. Within each of these three general groups, several products are available, which are classified with respect to parameters such as cold water solubility, viscosity, extent of conversion, etc.

1. White dextrins are prepared by spraying a powdered starch with acid (usually hydrochloric acid) while it is heated at 95°–120°C for 3–8 hours. Slight to extensive fragmentation can be brought about, but little transglucosidation or repolymerization is allowed to take place. The degree of conversion with white dextrins refers to the extent of fragmentation since this is essentially the only reaction that takes place. White dextrins are a mixture of low molecular weight fragments with an average chain length of about twenty anhydroglucose units (D.P. = 20).

2. Yellow or Canary Dextrins — are formed under conditions of higher heating and lower acidity than white dextrins, and are considered in the starch industry to be more highly converted, because of their increased branching than white dextrins. D.P. values are in roughly the same range as white dextrins.

3. British Gums are highly branched materials made by heating starches for long periods, i.e., 10–20 hours at 170°–195°C usually in absence of acid. D.P. values are higher than white and canary dextrins because transglucosidation and repolymerization are favored at the higher temperatures.

The desired salts of the dextrin carboxylates herein may be prepared by neutralizing the acid ester with a suitable base such as aqueous sodium or potassium bicarbonate, or ammonium hydroxide. Similarly, the substituted ammonium salts may be prepared by using an appropriately substituted amine as the base. Typical organic bases which can be used to form the substituted ammonium or amine salts include alkanolamines having 1–7 carbon atoms (i.e., monoethanolamine, diethanolamine or triethanolamine); morpholine; or tetramethylammonium hydroxide.

In preparing detergent compositions in accordance with the invention, the essential ingredients are (a) an organic water-soluble detergent surface active material as defined and illustrated below and (b) a herein dextrin carboxylate builder desirably as the soluble alkali metal salt. Such detergent compositions contain the essential ingredients in a ratio of builder to detergent surfactant in the range of about 1:3 to about 10:1 by weight. Aqueous solutions of the compositions exhibit a pH range of about 8 to about 2. The preferred ratio of builder to detergent surfactant is about 1:2 to about 5:1 while the optimum pH range is about 9.5 to about 11.5.

The organic detergent compounds, i.e., surface active agents, which can be utilized in the compositions of this invention are anionic, nonionic, ampholytic and zwitterionic synthetic detergents and mixtures thereof and are exemplified as follows:

a. Anionic synthetic non-soap detergents can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. Important examples of the synthetic detergents are the sodium or potassium alkyl sulfates, sodium or potassium alkylbenzenesulfonates, in which the alkyl group contains from about 9 to about 15 carbon atoms (the alkyl radical can be a straight or branched aliphatic chain); alkyl (glycerylsulfate) ether; sodium coconut oil fatty acid monoglyceride sulfates and sulfonates; sodium or potassium salts or sulfuric acid esters of the reaction product of one mole of a higher fatty alcohol (e.g., tallow or coconut oil alcohols) and about 1 to 6 moles of ethylene oxide, sodium or potassium salts of alkyl phenol ethylene oxide ether sulfate with about 1 to about 10 units of ethylene oxide per molecule and in which the alkyl radicals contain from 8 to about 12 carbon atoms: the reaction product of fatty acids esterified with isothionic acid and neutralized with sodium hydroxide, sodium or potassium salts of fatty acid amide of a methyl tauride, and sulfonated olefins.

b. Nonionic synthetic detergents: One class can be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Another class has semi-polar characteristics. Preferred classes of nonionic synthetic detergents are as follows:

1. A class of nonionic synthetic detergents under the trade name of "Pluronic." These compounds are formed by condensing ethylene oxide with a hydrophobic base formed by the condensation of propylene oxide with propylene glycol;

2. The polyethylene oxide condensates of alkyl phenols, e.g., the condensation products of alkyl phenols having an alkyl group containing from about 6 to 12 carbon atoms in either a straight chain or branched chain configuration with ethylene oxide;

3. Those nonionic synthetic detergents derived from the condensation of ethylene oxide with the product resulting from the reaction of propylene oxide and ethylene diamine;

4. The condensation product of aliphatic alcohols having from 8 to 22 carbon atoms, in either straight chain or branched chain configuration, with ethylene oxide;

5. The ammonia, monoethanol and diethanol amides of fatty acids having an acyl moiety of from about 8 to about 18 carbon atoms;

6. Long chain tertiary amine oxides such as dimethyl-dodecylamine oxide; cetyldimethylamine oxide; bis-(2-hydroxyethyl)-dodecylamine oxide; bis-(2-hydroxyethyl)-3-dodecoxy-1-hydroxypropylamine oxide;

7. Long chain tertiary phosphine oxides such as dimethyldodecylphosphine oxide; diethyldodecylphosphine oxide; dimethyl-(2-hydroxydodecyl) phosphine oxide;

8. Long chain sulfoxides such as dodecyl methyl sulfoxide; 3-hydroxytridecyl methyl sulfoxide; 3-methoxytridecyl methyl sulfoxide; 3-hydroxy-4-dodecoxybutyl methyl sulfoxide.

c. Ampholytic synthetic detergents can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphate, or phosphono. Examples of compounds falling within this definition are sodium-3-dodecylaminopropionate and sodium-3-dodecylaminopropanesulfonate.

d. Zwitterionic synthetic detergents can be broadly described as derivatives of aliphatic quaternary ammonium, phosphonium, and sulfonium compounds, in which the aliphatic radical may be straight chain or branched, and wherein one of the aliphatic substituents contains from about 8 to 18 carbon atoms and one contains an anionic water solubilizing group; e.g., carboxy, sulfo, sulfato, phosphato, or phosphono. Examples of compounds falling within this definition are 3-(N,N-dimethyl-N-hexadecylammonio)propane-1-sulfonate and 3-(N,N-dimethyl-N-hexadecylammonio)-2-hydroxy propane-1-sulfonate.

It should be noted that the novel builders herein are used either in the form of their alkali metal salts or in acid-form together with a sufficient quantity of an alkali metal base, such as the carbonate or hydroxide, in order to neutralize the carboxyl group and adjust the pH level of the final detergent solution to within the desired 9.5–11.5 range.

Methods for preparing detergent formulations are well known to those skilled in the art, a typical method involving drying the ingredients, forming them into an aqueous slurry and then spray drying. The final detergent formulations may be a mixture of dry ingredients, a concentrated aqueous solution or a solid mix resulting from the drying thereof, or a combination of dry solids and dry ingredients as is common in the art.

The following examples will further illustrate the embodiments of the invention. In these examples, unless noted otherwise, all parts given are by weight and temperatures are in degrees centigrade.

DEXTRIN CARBOXYLATES

EXAMPLE 1

To 1300 ml of pyridine in a 3-liter flask was added 486 g (3 moles) of dry-Nadex 320 — a white dextrin available from the National Starch Company and the resulting slurry heated to 60°C. Succinic anhydride (1035 g. 10.35 moles) was then added and the temperature raised to 100°C. After about 1 hour, a homogeneous solution had formed. Heating at 100°C was continued for 5 hours after which a test portion was removed from the reaction flask, added to water, evaporated to dryness and analyzed for free acid and ester content. From this data, the degree of substitution (D.S.) was calculated and found to be 2.6.

The remaining reaction mixture was poured into 4 liters of chloroform under rapid stirring and the resulting dextrin acid succinate, which precipitated as a solid, reslurried twice with cold chloroform. Unreacted anhydride was extracted by the solvent. The solids were removed by filtration and dried in vacuo giving 1002 gm of product. Purity of the product was verified by titration of free acidity and determination of ester content.

100 parts of the dextrin acid succinate was suspended in water with stirring and neutralized to pH 8.5 with 10% sodium hydroxide solution. The pH was kept below 9.0 during neutralization. The so-obtained soluble sodium salt formed by neutralization was bleached with about 1 part of 50% hydrogen peroxide and recovered by total evaporation to dry solids under reduced pressure. To so-obtained sodium salt was completely soluble, even at concentrations above 30%.

The dried product contained 89% sodium dextrin succinate, calculated as D.S.=2.6, 5.3% water and 5.7% sodium succinate. Its calcium sequestering value by the LAS procedure was 10.4 g calcium per 100 g builder on a 100% pure basis.

EXAMPLE 2

A mixture containing 143.8 g of succinic anhydride and 46.6 g of Stadex 140 — a highly converted British Gum commercially available from A. E. Staley Manufacturing Company — was allowed to react for 4 hours at 135°C in the presence of pyridine. The product, which had a D.S. value of 2.3, was recovered as described in Example 1. The final sodium salt was 87% pure dextrin acid ester and exhibited a calcium sequestering value of 10.7 (corrected for impurities) by the LAS method.

EXAMPLE 3

Following the procedure of the prior examples, a dextrin acid succinate ester was prepared from Nadex 525 — a British Gum available from the National Starch Company. The resulting product has a D.S. value of 2.3.

EXAMPLE 4

Succinic anhydride (125 g) and Stadex 128 (4015 g) — a commercial canary dextrin available from the A. E. Staley Manufacturing Company — were combined in the presence of pyridine at 135°C. The so-obtained product, in the form of its soluble sodium salt exhibited a calcium sequestering value of 9.9 (LAS), uncorrected for impurities and moisture.

EXAMPLE 5

Dry Nadex 320 (13.5 g, 0.083 mole) and 38.8 g of cis 4-cyclohexene-1,2 dicarboxylic anhydride (0.26 mole) were allowed to react at 115° for 2 days in 500 ml of pyridine. The reaction mixture was evaporated to dry solids. The product — dextrin acid tetrahydrophthalate — was suspended in water, neutralized to ph 8.5 with sodium hydroxide and evaporated to give dry solids consisting of sodium dextrin tetrahydrophthalate.

EXAMPLE 6

One part of the sodium dextrin tetrahydrophthalate from the previous example was dissolved in water containing 0.2 parts of 50% hydrogen peroxide. The solution was ozonized while keeping the pH between 7.5-8.0 by addition of sodium hydroxide when necessary. After ozoninzation was complete, the pH was adjusted to pH 8.5, excess peroxide was destroyed with sodium metabisulfite and the solution evaporated to dry solids consisting of trisodium dextrin butanetetracarboxylate.

EXAMPLES OF RAW STARCH (NON-DEXTRINIZED STARCH) CARBOXYLATES

EXAMPLE 7

Dry cornstarch (200 g, 124 moles) was suspended in 400 ml of anhydrous dimethyl sulfoxide at room temperature, and diluted with 1400 ml of pyridine. The mixture was heated to 70°C. Succinic anhydride (432 g, 4.32 mole) was then added.

The following data relating to D.S. and reaction time was obtained by periodic analysis of portions of the reaction mixture.

| Reaction time, hr. | D.S. |
|---|---|
| 1.5 | 1.20 |
| 2.5 | 1.25 |
| 4.5 | 1.67 |
| 6.5 | 1.73 |
| 22.0 | 2.04 |

After neutralization and evaporation, a soluble sodium salt of starch acid succinate with a purity of 92%, determined by saponification, was obtained. Its calcium sequestering value was 8.8 on a 100% pure basis (LAS).

EXAMPLE 8

Following the procedure of Example 7, 10.0 g of dry cornstarch was allowed to react with 37.2 g of succinic anhydride in a mixture consisting of 100 ml of dimethyl sulfoxide and 70 ml of pyridine. The molar ratio of anhydride/starch of 6.0 was designed to effect a high degree of substitution.

After reacting overnight at 80°-90°C the starch acid ester exhibited a D.S. value of 2.05 despite the large excess of anhydride.

The sodium starch succinate was obtained by neutralization with sodium hydroxide solution and was purified by precipitation from a 10% aqueous solution by addition of an equal volume of acetone. The purified salt assayed at 97% by saponification. Its calcium sequestering value (LAS) was 8.0, corrected to 100% impurity.

EXAMPLE 9

The procedure of Example 8 was repeated except that dimethyl sulfoxide was omitted. A homogeneous reaction mixture could not be obtained.

EXAMPLE 10

In this example, the cornstarch was subjected to the prejelling methods described by Pascu and Mullen: I. & E.C. 34, 807 (1942); ibid. 34, 1210 (1942). According to these processes cornstarch was heated to boiling in aqueous pyridine to increase its reactivity. The water was then removed by azeotropic distillation.

The so treated product, 40.5 g, was allowed to react overnight with 75.0 g of succinic anhydride in 120 ml of pyridine. The temperature was kept at approximately 100°. The final D.S. value of the product was 1.9. Its sodium salt, prepared as described in Example 7, was sparingly soluble at use levels encountered in automatic washing machines, that is 0.08% and 120°F.

As the examples aforesaid clearly demonstrate, the dextrin acid carboxylates of the invention are easier to prepare having much higher D.S. values — a desirable feature for superior builder efficiency — than the heretofore non-dextrinized or raw starch carboxylates.

TEST PROCEDURES

LAS CALCIUM SEQUESTERING METHOD

Three ml of sodium linear dodecylbenzene sulfonate (a linear alkylarenesulfonate; LAS) containing 0.900 g/liter of water is added to each of six test tubes (solution A), followed by 3.0 ml of a solution consisting of 2250 ppm of test builder (solution B). To each test tube is added 3.0 ml of various calcium chloride solutions adjusted to pH 9.5 and ranging in concentration from 300–1800 ppm (solution C).

The final solutions whose surfactant and builder content approximate those used under actual laundering conditions are placed in a constant temperature bath set at 120°F and allowed to equilibrate for 20 minutes from the time of mixing. These conditions closely simulate actual wash conditions.

Light scattering measurements are made at 0°C and 45°C. Turbidity is calculated and plotted vs. hardness ion concentration. Precipitation begins at the hardness level where the calcium sequestering value of the builder is exceeded.

Any calcium ion builder interactions leading to formation of precipitates are determined by using distilled water in place of solution A.

Calcium Capacity = g calcium/100 g builder $$\frac{\text{ppm calcium chloride at point of incipient precipitation} \times 0.3636 \times 100}{750 \text{ ppm of builder}}$$

DETERGENT FORMULATION

Detergent formulations containing the builders of the invention were prepared by blending together the recited components in the proportions indicated, including sodium silicate as an anticorrosive and buffering agent and adjusting the pH where necessary with caustic. The formulations were then tested for detergency efficiency in the Terg-O-Tometer test. The test conditions and results are summarized in Table I.

TABLE I

Terg-O-Tometer Test Results

| Detergent Composition % By Weight | Builder Type | | |
|---|---|---|---|
| | Sodium Tri-polyphosphate | Dextrin (white) Succinate D.S.=2.6[1] | None |
| Builder | 35 | 50 | 0 |
| Sodium Metasilicate pentahydrate ($Na_2SiO_3 \cdot 5H_2O$) | 12 | 12 | 12 |
| Surfactant (Sodium linear dodecylbenzene sulfonate) | 20 | 20 | 20 |
| Sodium Sulfate | 33 | 18 | 68 |
| Soil Removal, % of Standard[2] on: | | | |
| Cotton | 100 | 96 | 92 |
| Polyester-Cotton | 84 | 84 | 80 |

[1]Product of Example 1.
[2]Standard taken as 100% for soil removal on cotton by 35% sodium tripolyphosphate formulation. Soil-removal is measured by reflectance using a Gardner automatic color difference meter, Model AC-3.

As is evident from the test data of Table I, dextrin succinate of the invention is effective as a builder in detergent compositions. Other dextrin carboxylates herein behave comparably. The combination of biodegradability and good cleansing properties render the dextrin carboxylates of the invention suitable as environmentally compatible detergent builders.

What is claimed is:

1. A dextrin carboxylate comprising a dextrinized starch of about 20 to about 100 anhydroglucose units wherein from about 2.2 to about 2.8 average OH groups per anhydroglucose unit are esterified through one of the carboxyls of a non-aromatic polycarboxylic acid of 2–4 carboxyls containing 2 to 10 carbon atoms and the water-soluble salts thereof.

2. A composition according to claim 1 wherein the dextrin carboxylate is dextrin succinate.

3. A composition according to claim 1 wherein the dextrin carboxylate is dextrin cis 4-cyclohexene-1,2 dicarboxylate.

4. The composition according to claim 1 wherein the dextrin carboxylate is dextrin butane tetracarboxylate.

* * * * *